(12) United States Patent
Rossiter

(10) Patent No.: US 9,229,087 B1
(45) Date of Patent: Jan. 5, 2016

(54) TARGETING SYSTEM

(76) Inventor: Michael Christopher Rossiter, Chatham (GB)

( * ) Notice: Subject to any disclaimer, the term of this patent is extended or adjusted under 35 U.S.C. 154(b) by 1826 days.

(21) Appl. No.: 08/943,476

(22) Filed: Jul. 28, 1997

(30) Foreign Application Priority Data

Jul. 9, 1996 (GB) .................................. 9614398.7
Sep. 11, 1996 (GB) .................................. 9619023.6

(51) Int. Cl.
*G01S 5/00* (2006.01)
*G01S 3/808* (2006.01)

(52) U.S. Cl.
CPC ............... *G01S 3/808* (2013.01); *G01S 5/0009* (2013.01)

(58) Field of Classification Search
CPC ............................... G01S 3/808; G01S 5/0009
USPC ............................ 367/3, 5, 99, 124
See application file for complete search history.

(56) References Cited

U.S. PATENT DOCUMENTS

| 4,717,916 A | * | 1/1988 | Adams et al. ..................... 367/8 |
| 4,811,308 A | | 3/1989 | Michel .......................... 367/136 |
| 5,175,710 A | * | 12/1992 | Hutson ......................... 367/135 |
| 5,432,753 A | * | 7/1995 | Maranda ....................... 367/135 |

FOREIGN PATENT DOCUMENTS

| GB | 2 253 107 A | | 8/1992 | |
| GB | 2390160 A | * | 12/2003 | ............ G01S 7/6218 |
| GB | 2521094 A | * | 6/2015 | ............. G01S 3/808 |
| WO | WO 87/07032 | | 11/1987 | |
| WO | WO 96/12199 | | 4/1996 | |

* cited by examiner

*Primary Examiner* — Daniel Pihulic

(57) ABSTRACT

A targeting system comprising a plurality of directional sensors (11) to monitor a spatial area. Each sensor (11) transmits time series information about possible targets to a remote receiver (13), the time series information is processed by processor (14) to select at least one frequency line track (23). Various target parameters associated with each frequency line track are processed by processor (15) to derive tonal association information about possible targets which is displayed on display (16).

36 Claims, 3 Drawing Sheets

TARGETING SYSTEM

BACKGROUND OF THE INVENTION

This invention relates to the resolution of ambiguities associated with a plurality of targets within a spatial area monitored by a plurality of directional sensors.

At present, if an unknown number of targets exist within a spatial area which is monitored by a plurality of directional sensors at known positions, it is difficult to estimate the number and positions of those targets.

In an ideal case, if only the angle of arrival of tonal information from a target to a directional sensor can be determined, and if the tonal information can be detected in such a way by a plurality of directional sensors, then the position of that target can be found by the bearing intersection of the direction vectors, extending from each directional sensor at the angle of arrival of the tonal information.

However, in practice, propagation effects usually limit the number of targets detected at any one sensor, making it no longer possible to estimate the number and positions of multiple targets by simple examination of the bearing intersections.

A frequency line track is a tonal signal and associated parameters such as a bearing estimate (or an angle of arrival at a sensor), signal strength, frequency or bandwidth.

BRIEF SUMMARY OF THE INVENTION

It is an object of this invention to obviate or mitigate this disadvantage.

According to a first aspect of the present invention there is provided a targeting system, for the resolution of ambiguities associated with a plurality of targets within a spatial area, comprising
- a plurality of directional sensors arranged in a network in said spatial area and operable to provide time series information about targets within said spatial area,
- a transmitter operably connected to each said directional sensor and operable to transmit said time series information,
- a remote receiver operable to receive transmitted said time series information from said transmitter,
- a processor operably connected to said receiver comprising means to select frequency line track information for said time series information and means to compare frequency line track information provided by adjacent pairs of sensors to derive tonal association information about possible target positions, and
- a display means operably connected to said processor and arranged to display said association information.

Preferably, said processor may be arranged to derive tonal information from said time series information, said display means may be operable to display said tonal information as a spectrogram and operable to display said tonal association information as an overlay on said spectrogram.

The said directional sensors are sonobuoys.

The said frequency line track information may comprise time series signals and parameter data associated with said time series signals.

Preferably, said processor may further comprise means to transform said time series signals into frequency series signals, means of determining discrete frequencies within said frequency series signals and may determine frequency line tracks from said discrete frequencies that exist for greater than a predetermined time.

The said processor may be arranged to derive association information about possible target positions by the combination of weighted summation of bearing, Doppler, ratio and harmonic association evidence factors, generated by said processor, for a selected region of said spatial area, for each frequency line track.

Preferably, the said evidence factor for bearing association of a frequency line track to a selected region may be incremented for each directional sensor when an angle of arrival estimate of said frequency line track, taken from the centre of said selected region, is separated from the centre of that region by less than or equal to 90 degrees or alternatively said evidence factor for bearing association of a frequency line track to a selected region may be decremented for each directional sensor when an angle of arrival estimate of said frequency line track, taken from the centre of said selected region, is separated from said centre of that region by greater than 90 degrees.

The said evidence factor for Doppler association of a frequency line track to a selected region may be incremented for each directional sensor when a substantially similar frequency line track is determined by said processor for its nearest neighbour directional sensor, when said nearest neighbour directional sensor has associated that similar frequency line track to that selected region, at a substantially similar time and said frequency line tracks are substantially Doppler consistent. The said evidence factor for Doppler association of a frequency line track to a selected region may also be incremented for each directional sensor when substantially similar bandwidth estimates are determined by said processor for said Doppler consistent frequency line tracks. The said evidence factor for Doppler association of a frequency line track to a selected region may also be incremented for each directional sensor when substantially similar diffuseness estimates are determined by said processor for said Doppler consistent frequency line tracks.

The said evidence factor for ratio association of a frequency line track to a selected region may be incremented for each directional sensor when a pair of frequency line tracks for a directional sensor are substantially Doppler consistent with a pair of frequency line tracks for its nearest neighbour directional sensor and have substantially constant frequency ratios between said frequency line tracks of said pairs.

The said evidence factor for harmonic association of a frequency line track to a selected region may be incremented for each directional sensor when a group, of a size greater than a predetermined minimum, of substantially equivalent harmonic frequency line tracks are determined for said selected region. The said evidence factor for harmonic association for a selected region is may also be incremented for each directional sensor when substantially Doppler equivalent fundamental frequencies are determined for groups of frequency line tracks at that directional sensor and groups of frequency line tracks at its nearest neighbour directional sensor which has been associated with said same selected region.

The said processor may be arranged to generate said display for a selected region by combination of weighted summation of said bearing, Doppler and ratio association evidence factors for each frequency line track. A weighted summation of bearing, Doppler, ratio and harmonic evidence factors for a frequency line track may be used to assign a brightness intensity value to indicate a level of association of said frequency line track with said selected region. Frequency line tracks in a selected region may be assigned a colour to differentiate those frequency line tracks from frequency line tracks of other selected regions simultaneously displayed on said display means.

According to a second aspect of the present invention there is provided a method, for the resolution of ambiguities associated with a plurality of targets within a spatial area, comprising deploying a plurality of directional sensors in said spatial area, transmitting time series information about targets within said spatial area from said directional sensors, receiving said time series information, processing said time series information to select frequency line track information, comparing said frequency line track information provided by adjacent pairs of sensors to derive tonal association information about possible target positions, and displaying said association information.

The method may comprise deriving tonal information from said received time series information, displaying said tonal information on a spectrogram and arranging said association information as an overlay on said spectrogram.

The frequency line track information may comprise time series signals and parameter data associated with said time series signals, and the method may include transforming said time series signals into frequency series signals. The method may include selecting discrete frequencies from said frequency series signals and may include determining each frequency line track from said discrete frequency series signals that exist for greater than a predetermined time.

Preferably, the method may include deriving association information about possible target positions by combining a weighted summation of evidence factors, for a selected region of said spatial area, using bearing, Doppler, ratio and harmonic association computations for each frequency line track.

The method may include computing said evidence factor for bearing association in said selected region by incrementing that evidence factor for each direction sensor when an angle of arrival estimate of a frequency line track, taken from the centre of said selected region, is separated from the centre of that region by less than or equal to 90 degrees or alternatively may include computing said evidence factor for bearing association in said selected region by decrementing that evidence factor for each directional sensor when an angle of arrival estimate of a frequency line track, taken from the centre of said selected region, is separated from the centre of that region by greater than 90 degrees.

The method may include computing an evidence factor for Doppler association in said selected region by incrementing that evidence factor for each directional sensor when a substantially similar frequency line track exists for that selected region at its nearest neighbour directional sensor, when said nearest neighbour directional sensor has associated that similar frequency line track to said selected region at substantially the same time and said frequency line tracks are substantially Doppler consistent. The method may include computing said evidence factor for Doppler association in said selected region by also incrementing that evidence factor for each directional sensor when substantially similar bandwidth estimates exist for said Doppler consistent frequency line tracks. The method may include computing said evidence factor for Doppler association in said selected region by also incrementing that evidence factor for each directional sensor when substantially similar diffuseness estimates exist for said Doppler consistent frequency line tracks.

The method may include computing said evidence factor for ratio association in said selected region by incrementing that evidence factor for each directional sensor when a pair of frequency line tracks for that directional sensor are substantially Doppler consistent with a pair of frequency line tracks for its nearest neighbour directional sensor and have substantially similar frequency ratios between said frequency line tracks of said pairs.

The method may include computing said evidence factor for harmonic association of a frequency line track to a selected region by incrementing that evidence factor for each directional sensor when a group, of a size greater than a predetermined minimum, of substantially equivalent harmonic frequency line tracks are determined for said selected region. The method may include computing said evidence factor for harmonic association in said selected region by also incrementing that evidence factor for each directional sensor when substantially Doppler equivalent fundamental frequencies are determined for groups of frequency line tracks at that directional sensor and groups of frequency line tracks at its nearest neighbour directional sensor which have been associated with said selected region.

The method may include generating a spectrogram to display tonal information derived from said time series information on a display means and generating said display using, as an overlay for said spectrogram, a combination of weighted summation for bearing, Doppler and ratio association evidence factors generated for said selected region. The method may include assigning a brightness intensity value for each frequency line track in said selected region using said weighted summation of bearing, Doppler, ratio and harmonic association evidence factors to indicate a level of association of said frequency line track with said selected region. The method may include differentiating frequency line tracks displayed simultaneously on the same display means for a selected region by assigning a colour to each selected region and assigning that colour to frequency line tracks corresponding to said selected regions.

BRIEF DESCRIPTION OF THE DRAWINGS

The invention is further described, by way of example only, with reference to the accompanying drawings, in which.

DETAILED DESCRIPTION OF THE PREFERRED EMBODIMENT

Figure 1:
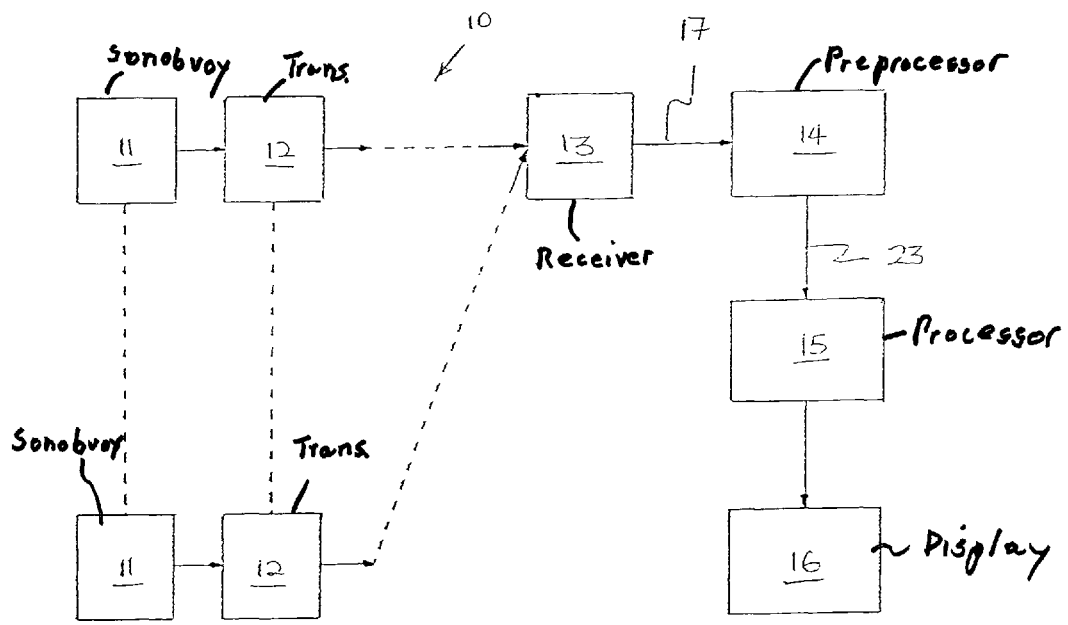
FIG. 1 is a block diagram of a targeting system incorporating means to resolve target ambiguities.

In FIG. 1, a targeting system 10 is arranged to resolve ambiguities associated with a plurality of targets within a spatial area and comprises a plurality of sonobuoys 11, positioned throughout the spatial area, to monitor tonal information emanating from a plurality of targets and are operably connected to respective transmitters 12 for the transmission of the time series information to a remote receiver 13.

The receiver 13 receives the information transmitted by all of the transmitters 12 and sends an input signal 17 to a pre-processor 14 which is operably connected to a processor 15 that is further operably connected to a display 16. This could be of any convenient form and can comprise a spectrogram.

Figure 2:
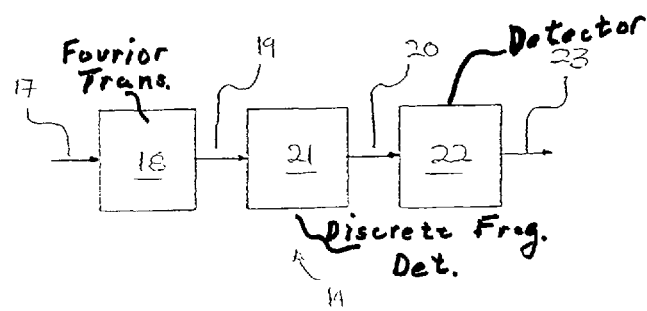
FIG. 2 is a block diagram illustrating the pre-processing.

FIG. 2 is a block diagram of the pre-processor 14 which receives the input signal 17 comprising time series signals and parameter estimates corresponding to each time series signal. The time series signal portion of the input signal 17 is converted by a Fourier transformer 18 into a frequency spectrum signal 19. Discrete frequencies 20 are found in the frequency spectrum signal 19 by using a discrete frequency detector 21. A detector 22 is used to detect frequency line tracks 23 that exist for greater than a pre-determined time.

Each frequency line track 23 has a plurality of corresponding parameter estimates which provide information about that frequency line track. These may be:—
(a) A unique identifier.
(b) A discrete frequency number which gives the position of the discrete frequency within the frequency spectrum signal 19.
(c) An accurate frequency estimate, measured in Hertz.
(d) A signal strength which is defined as a multiple of the theoretical noise standard deviation.
(e) An angle of arrival estimate.
(f) A count of the number of good updates.
(g) A bandwidth estimate.
(h) A diffuseness estimate.

The frequency line tracks 23 are passed to the processor 15 which determines a confidence factor, for each selected region, that a possible target exists within that region and is separated into first and second stages. The first stage 24 (described later with reference to FIG. 3) searches for evidence from each sonobuoy 11 of a target using the parameter estimates to determine if any line track 23 can be independently associated with the selected region. The second stage 25 (described later with reference to FIG. 4) searches for evidence from pairs of sonobuoys 11 of a target using the parameter estimates to determine if pairs of line tracks 23 can be associated with the selected region.

A problem arises if all possible sonobuoy 11 pairs were to be examined for association with a selected region, as the number of possible pairs is approximately proportional to the square of the number of sonobuoys 11. Since many of these pairs would not provide useful information, because their separation prevents the sonobuoys 11 detecting the same targets due to propagation effects, the following approach for processing has been devised. The number of pairs has been set equal to the number of sonobuoys 11 and each sonobuoy 11 is paired only with its nearest spatial neighbouring sonobuoy 11.

Figure 3:
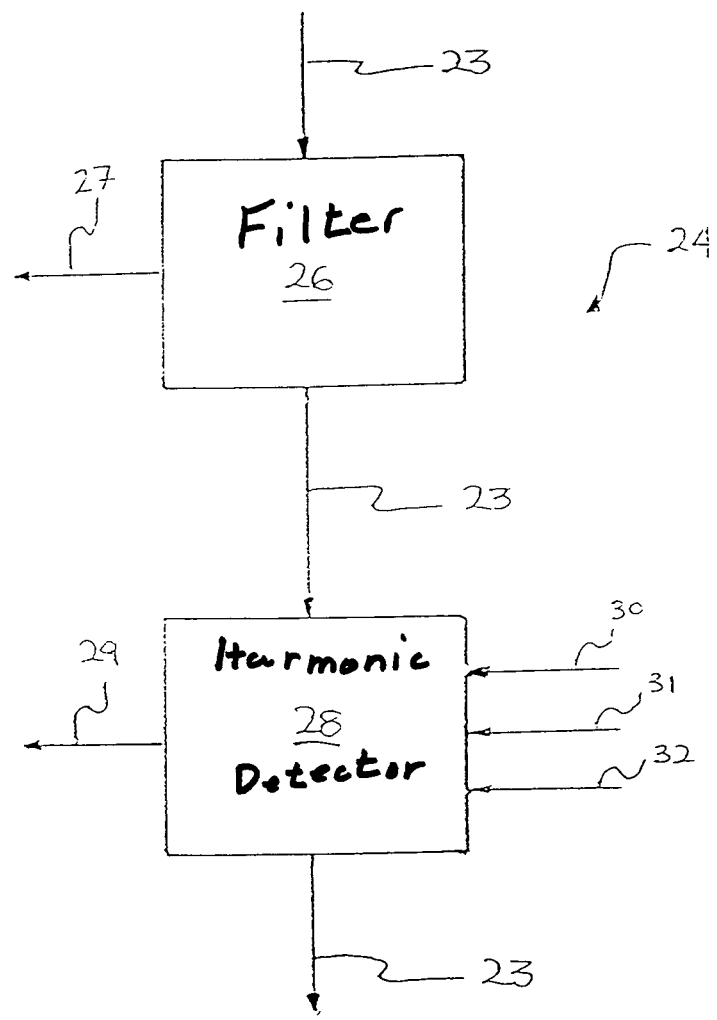
FIG. 3 is a dock diagram illustrating a first stage of processing.

Referring to FIG. 3, a first element of the first stage 24 of processing for each sonobuoy is to pass the parameter estimate portion of each line track 23 through a filter 26 which selects line tracks 23 that have not been previously disassociated from the selected region, then update an evidence factor 27 for bearing association for each line track. Bearing association is a function of the bearing separation of a line track from the centre of the selected region.

If the line track bearing estimate is separated by greater than 90 degrees from the selected region centre bearing, then the evidence factor 27 is decremented. The line track will be considered as disassociated from the selected region if the evidence factor 27 is decremented to below a specified threshold. If a line track is disassociated with a selected region it is not possible for it to become re-associated with that region at a later time.

If the line track bearing estimate is separated by less than or equal to 90 degrees from the selected region centre bearing, then the following equation describes the updating of the evidence factor 27.

$$e_{k+1} = (e_k + A)\cos(\Theta_k)$$

where $e_k$ is the evidence factor 27, A is a constant increment factor and $\Theta_k$ is the angular separation of the line track bearing estimate from the selected region centre bearing at the kth update.

A threshold for probable association of a line track with a selected region can be derived from the expectation E of the evidence factor 27 by the following equation:

$$E[e_k] = \frac{A\cos(\Theta)}{1-\cos(\Theta)}$$

For example, if the constant A is assigned a value of 0.5 and it is assumed that the line track is associated if the bearing separation is always less than 31 degrees, then the expected value is 3. The value 3 provides the threshold for association of a line track 23 with any region. With this threshold, it will take at least 7 update intervals for a line track 23 to be associated with a region if the bearing separation is always less than 10 degrees and at least 18 update intervals if the bearing association is closer to 30 degrees.

Should a sonobuoy 11 lie within the selected region, then no change is made to any of the evidence factors for association of a line track 23 to that region.

A second element of the first stage 24 is to determine sets of line tracks 23 from each sonobuoy 11 which are probably associated with the selected region and which can be harmonically associated. This is achieved by applying the parameter estimates of the line tracks 23 associated with the selected region to a harmonic detector 28. The harmonic detector 28 makes an assumption about the fundamental frequency and then determines frequency estimates for the line tracks 23 which can be harmonically associated with that fundamental frequency. When all of the line tracks 23 have been checked, a harmonic evidence factor 29 is incremented if more than 3 harmonic associations are made. Once a harmonic association of line track 23 has been made, that line track 23 is removed from additional searches for other harmonic associations.

Figure 4:
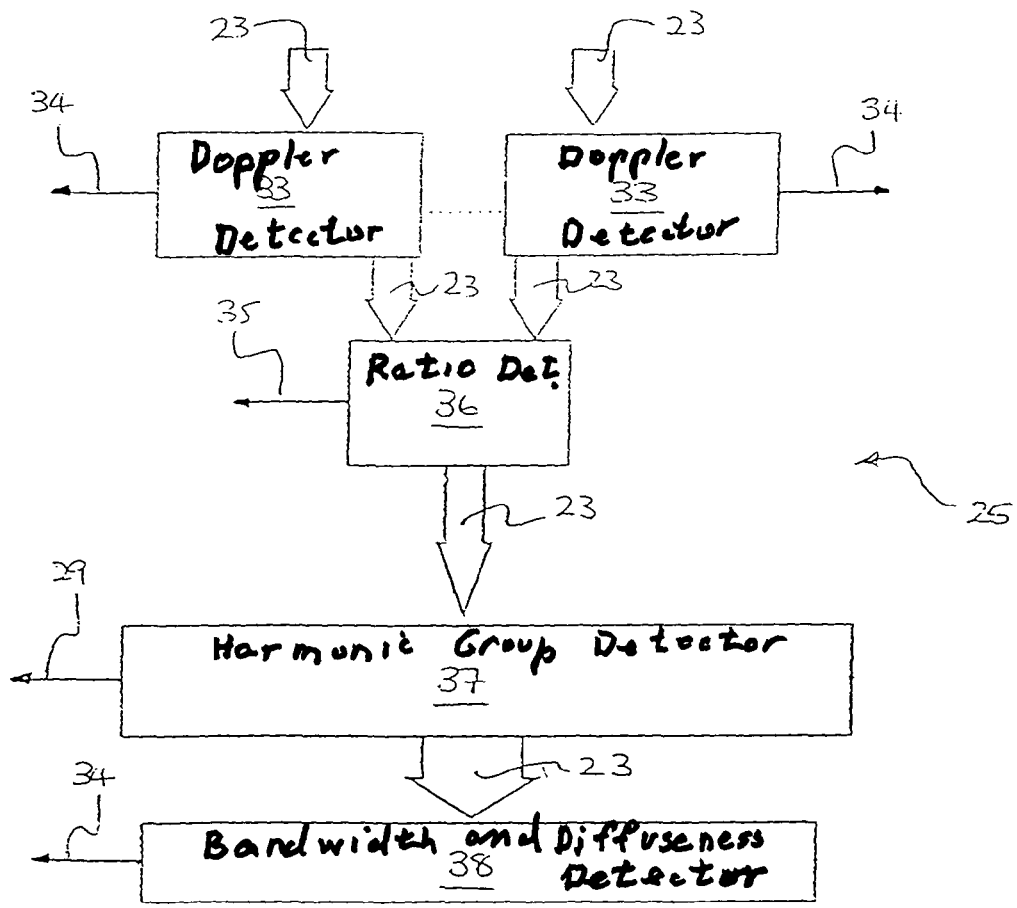
FIG. 4 is a block diagram illustrating a second stage of processing.

Referring to FIG. 4, a first element of the second stage 25 of processing is to make a search to determine if line tracks 23 exist which are Doppler consistent across a pair of sonobuoys 11. This is achieved by using a Doppler detector 33 to determine a Doppler evidence factor 34 which is incremented if a line track 23 exists on the nearest neighbour sonobuoy 11 which satisfies the following constraints:—
(a) the line tracks 23 are associated with the same selected region;
(b) the line tracks 23 exist in the same update interval, and
(c) the line tracks 23 are Doppler consistent.

A source frequency of a line track is estimated using estimates of speed and course, obtained in any convenient manner, using the following equation:—

$$fs = fo/(1 - u/c \cos(\Theta - \Phi))$$

where fs and fo are the source and observed frequencies, u is the target speed, c is the speed of sound in water, $\Theta$ is the bearing estimate for the line track and $\Phi$ is the target heading.

In order to allow for errors in the estimate of the course, two estimates f1 and f2 are made for the source frequency.

$$f1 = fo/(1 - u/c \cos(\Theta - \Phi - \epsilon))$$

$$f2 = fo/(1 - u/c \cos(\Theta - \Phi + \epsilon))$$

where $\epsilon$ is an estimate of the error.

An upper frequency limit fu and lower frequency fl are calculated as follows:—.

$$fu = \max(f1, f2)(1 + u/c)$$

$$fl = \min(f1, f2)(1 - u/c)$$

A line track 23 on the nearest neighbour sonobuoy 11 is considered as Doppler consistent if the frequency estimate for that line track 23 is between the upper and lower frequency limits of fu and fl.

If a Doppler consistent line track 23 is detected by detector 33 on the nearest neighbour sonobuoy 11, the Doppler evidence factor 34 for the line track 23 for the sonobuoy 11 is incremented.

A second element of the second stage 25 of processing is to determine a ratio evidence factor 35 using a ratio detector 36 which searches for line track 23 pairs which have a constant frequency ratio across sonobuoy 11 pairs.

If a line track A on a first sonobuoy is Doppler consistent with line track C on a second sonobuoy and a line track B on the first sonobuoy is Doppler consistent with line track D on the second sonobuoy, then line tracks A, B, C and D satisfy the ratio criterion if the line track frequencies satisfy the following condition, $$1 - \left| \frac{A}{B} \frac{D}{C} \right| < t$$

where t represents a measurement of tolerance, which is a function of the spectral resolution and the individual line track frequencies.

The ratio evidence factor 35 for line tracks A and B should be incremented if the criterion is met. The evidence factor 35 for the tracks C and D are not incremented when the condition is met as the detector 36 is intended to be for a single sonobuoy 11 and only the evidence factor 35 for that sonobuoy 11 is updated.

A third element of the second stage 25 of processing is to determine if substantially similar harmonic groups exist at different sonobuoys 11 and which have both been associated with the selected regions. This is achieved by detecting harmonic groups with a harmonic group detector 37. If the fundamental frequencies for each group are Doppler consistent, then the harmonic evidence factor 29 can be incremented.

A final element of the second stage 25 of processing is to determine if line tracks 23 which are Doppler consistent have similar bandwidth and diffuseness estimates. This is achieved by a bandwidth and diffuseness detector 38. If the line tracks have similar estimates for either the bandwidth or diffuseness the Doppler evidence factor 34 is incremented, because the line tracks 23 probably have a common source.

A confidence factor can be calculated for each selected region and a display for each sensor can be generated. The confidence factor for the existence of a target within a selected region is derived from the functions performed in the first and second stages 24, 25 of processing. The processor 15 combines the evidence factors for all line tracks 23 on all sonobuoys 11 to derive the confidence factor using the following equation;

$$CF = \frac{(W1 \cdot \text{Sum Doppler } EF) + (W2 \cdot \text{Sum Ratio } EF)}{(W1 + W2) \text{ Sum Bearing } EF}$$

where CF is the confidence factor for the selected region, W1 and W2 are weighting factors.

A maximum confidence factor is achieved if every line track 23 associated with the selected region is Doppler consistent with a line track 23 on the nearest neighbour sonobuoy and has been included in at least one ratio calculation. The confidence factor is low if the selected region contains no Doppler consistent line tracks 23.

The confidence factor does not include the harmonic evidence factor 29 as this does not provide any information about how the line tracks 23 are associated across sonobuoys.

A display for each selected region can be generated by assigning a brightness intensity value to indicate the level of association for each line track. This display is preferably in the form of an overlay for a spectrogram 16.

The brightness intensity value BIV for each line track 23 is defined by the following function:—

BIV=$W1$·Regional EF+$W2$·Doppler EF+$W3$·Ratio EF+$W4$·Harmonic EF where W1, W2, W3, and W4 represent weighting factors applied to each of the evidence factors.

All line tracks 23, which have not been associated with selected regions will be set to a brightness intensity value of zero. Colour may be used to differentiate the results for several selected regions displayed simultaneously.

What I claim is:

1. A targeting system, for the resolution of ambiguities associated with a plurality of targets within a spatial area, comprising:

a plurality of passive directional sensors arranged in a network in said spatial area and operable to monitor tonal information emanating from a plurality of targets within said spatial area and to provide corresponding time series information about the targets, a respective transmitter operably connected to each said directional sensor and operable to transmit said time series information, a remote receiver operable to receive transmitted said time series information from said transmitter, a processor operably connected to said receiver comprising means to select frequency line track information from said time series information and means to compare frequency line track information provided by adjacent pairs of sensors to derive tonal association information about possible target positions, and a display means operably connected to said processor and operable to display said association information.

2. A targeting system, as in claim 1, wherein said processor is arranged to derive tonal information from said time series information, said display means is operable to display said tonal information as a spectrogram and operable to display said tonal association information as an overlay on said spectrogram.

3. A targeting system, as in claim 1, wherein said directional sensors are sonobuoys.

4. A targeting system, as in claim 1, wherein said frequency line track information comprises time series signals and parameter data associated with said time series signals.

5. A targeting system, as in claim 4, wherein said processor further comprises means to transform said time series signals into frequency series signals.

6. A targeting system, as in claim 5, wherein said processor also comprises means of determining discrete frequencies within said frequency series signals.

7. A targeting system, as in claim 6, wherein said processor also determines frequency line tracks from said discrete frequencies that exist for greater than a predetermined time.

8. A targeting system, as in claim 7, wherein said processor is arranged to derive association information about possible target positions by the combination of weighted summation of bearing, Doppler, ratio and harmonic association evidence factors, generated by said processor, for a selected region of said spatial area, for each frequency line track.

9. A targeting system, as in claim 8, wherein said evidence factor for bearing association of a frequency line track to a selected region is incremented for each directional sensor when an angle of arrival estimate of said frequency line track, taken from the centre of said selected region, is separated from the centre of that region by less than or equal to 90 degrees.

10. A targeting system, as in claim 8, wherein said evidence factor for bearing association of a frequency line track to a selected region is decremented for each directional sensor when an angle of arrival estimate of said frequency line track, taken from the centre of said selected region, is separated from said centre of that region by greater than 90 degrees.

11. A targeting system, as in claim 8, wherein said evidence factor for Doppler association of a frequency line track to a selected region is incremented for each directional sensor when a substantially similar frequency line track is determined by said processor for its nearest neighbour directional sensor, when said nearest neighbour directional sensor has associated that similar frequency line track to that selected region, at a substantially similar time and said frequency line tracks are substantially Doppler consistent.

12. A targeting system, as in claim 11, wherein said evidence factor for Doppler association of a frequency line track to a selected region is also incremented for each directional sensor when substantially similar bandwidth estimates are determined by said processor for said Doppler consistent frequency line tracks.

13. A targeting system, as in claim 11, wherein said evidence factor for Doppler association of a frequency line track to a selected region is also incremented for each directional sensor when substantially similar diffuseness estimates are determined by said processor for said Doppler consistent frequency line tracks.

14. A targeting system, as in claim 8, wherein said evidence factor for ratio association of a frequency line track to a selected region is incremented for each directional sensor when a pair of frequency line tracks for a directional sensor are substantially Doppler consistent with a pair of frequency line tracks for its nearest neighbour directional sensor and have substantially constant frequency ratios between said frequency line tracks of said pairs.

15. A targeting system, as in claim 8, wherein said evidence factor for harmonic association of a frequency line track to a selected region is incremented for each directional sensor when a group, of a size greater than a predetermined minimum, of substantially equivalent harmonic frequency line tracks are determined for said selected region.

16. A targeting system, as in claim 15, wherein said evidence factor for harmonic association for a selected region is also incremented for each directional sensor when substantially Doppler equivalent fundamental frequencies are determined for groups of frequency line tracks at that directional sensor and groups of frequency line tracks at its nearest neighbour directional sensor which has been associated with said same selected region.

17. A targeting system, as in claim 8, wherein said processor is arranged to generate said display for a selected region by combination of weighted summation of said bearing, Doppler and ratio association evidence factors for each frequency line track.

18. A targeting system, as in claim 17, wherein a weighted summation of bearing, Doppler, ratio and harmonic association evidence factors for a frequency line track are used to assign a brightness intensity value to indicate a level of association of said frequency line track with said selected region.

19. A targeting system, as in claim 18, wherein frequency line tracks in a selected region are assigned a colour to differentiate those frequency line tracks from frequency line tracks of other selected regions simultaneously displayed on said display means.

20. A method, for the resolution of ambiguities associated with a plurality of targets within a spatial area, comprising:
  deploying a plurality of passive directional sensors in said spatial area to monitor tonal information emanating from a plurality of targets in said spatial area and to provide corresponding time series information about the targets,
  transmitting the time series information about targets within said spatial area from said directional sensors to a remote receiver,
  receiving said time series information,
  processing said time series information to select frequency line track information,
  comparing said frequency line track information provided by adjacent pairs of sensors to derive tonal association information about possible target positions, and
  displaying said association information.

21. A method, as in claim 20, comprising deriving tonal information from said received time series information, displaying said tonal information on a spectrogram and arranging said association information as an overlay on said spectrogram.

22. A method, as in claim 20, wherein said frequency line track information comprises time series signals and parameter data associated with said time series signals, including transforming said time series signals into frequency series signals.

23. A method, as in claim 22, including selecting discrete frequencies from said frequency series signals.

24. A method, as in claim 23, including determining each frequency line track from said discrete frequency series signals that exist for greater than a predetermined time.

25. A method, as in claim 24, including deriving association information about possible target positions by combining a weighted summation of evidence factors, for a selected region of said spatial area, using bearing, Doppler, ratio and harmonic association computations for each frequency line track.

26. A method, as in claim 25, including computing said evidence factor for bearing association in said selected region by incrementing that evidence factor for each direction sensor when an angle of arrival estimate of a frequency line track, taken from the centre of said selected region, is separated from the centre of that region by less than or equal to 90 degrees.

27. A method, as in claim 25, including computing said evidence factor for bearing association in said selected region by decrementing that evidence factor for each directional sensor when an angle of arrival estimate of a frequency line track, taken from the centre of said selected region, is separated from the centre of that region by greater than 90 degrees.

28. A method, as in claim 25, including computing said evidence factor for Doppler association in said selected region by incrementing that evidence factor for each directional sensor when a substantially similar frequency line track exists for that selected region at its nearest neighbour directional sensor, when said nearest neighbour directional sensor has associated that similar frequency line track to said selected region at substantially the same time and said frequency line tracks are substantially Doppler consistent.

29. A method, as in claim 28, including computing said evidence factor for Doppler association in said selected region by also incrementing that evidence factor for each directional sensor when substantially similar bandwidth estimates exist for said Doppler consistent frequency line tracks.

30. A method, as in claim 28, including computing said evidence factor for Doppler association in said selected region by also incrementing that evidence factor for each directional sensor when substantially similar diffuseness estimates exist for said Doppler consistent frequency line tracks.

31. A method, as in claim 25, including computing said evidence factor for ratio association in said selected region by incrementing that evidence factor for each directional sensor when a pair of frequency line tracks for that directional sensor are substantially Doppler consistent with a pair of frequency line tracks for its nearest neighbour directional sensor and have substantially similar frequency ratios between said frequency line tracks of said pairs.

32. A method, as in claim 25, including computing said evidence factor for harmonic association of a frequency line track to a selected region by incrementing that evidence factor for each directional sensor when a group, of a size greater than a predetermined minimum, of substantially equivalent harmonic frequency line tracks are determined for said selected region.

33. A method, as in claim 32, including computing said evidence factor for harmonic association in said selected region by also incrementing that evidence factor for each directional sensor when substantially Doppler equivalent fundamental frequencies are determined for groups of frequency line tracks at that directional sensor and groups of frequency line tracks at its nearest neighbour directional sensor which have been associated with said selected region.

34. A method, as in claim 25, including generating a spectrogram to display tonal information derived from said time series information on a display means and generating said display using, as an overlay for said spectrogram, a combination of weighted summation for bearing, Doppler and ratio association evidence factors generated for said selected region.

35. A method, as in claim 34, including assigning a brightness intensity value for each frequency line track in said selected region using said weighted summation of bearing, Doppler, ratio and harmonic evidence factors to indicate a level of association of said frequency line track with said selected region.

36. A method, as in claim 34, including differentiating frequency line tracks displayed simultaneously on the same display means for a selected region by assigning a colour to each selected region and assigning that colour to frequency line tracks corresponding to said selected regions.

* * * * *